(12) United States Patent
Song et al.

(10) Patent No.: US 12,380,489 B2
(45) Date of Patent: Aug. 5, 2025

(54) METHOD AND DEVICE FOR CONTROLLING LIVE CONTENT STREAMING SERVICE

(71) Applicant: NAVER CORPORATION, Seongnam-si (KR)

(72) Inventors: Jaehoon Song, Seongnam-si (KR); Soo Ha Park, Seongnam-si (KR); Mulgyeol Kang, Seongnam-si (KR); Seung Hye Lee, Seongnam-si (KR); Yi Seul Ga, Seongnam-si (KR); Soo Ryun Shin, Seongnam-si (KR); Kyung Hee Yoon, Seongnam-si (KR); Eunyoung Seo, Seongnam-si (KR); Jee Won Nam, Seongnam-si (KR); Hyo Jin Kim, Seongnam-si (KR); Jun Young Jang, Seongnam-si (KR); Nakyung Lim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 196 days.

(21) Appl. No.: 17/373,263

(22) Filed: Jul. 12, 2021

(65) Prior Publication Data
US 2022/0198551 A1   Jun. 23, 2022

(30) Foreign Application Priority Data

Dec. 22, 2020   (KR) .................. 10-2020-0181102

(51) Int. Cl.
*G06Q 30/0601*   (2023.01)
*H04N 21/2187*   (2011.01)
(Continued)

(52) U.S. Cl.
CPC ..... *G06Q 30/0643* (2013.01); *G06Q 30/0623* (2013.01); *H04N 21/2187* (2013.01);
(Continued)

(58) Field of Classification Search
CPC ......... G06Q 30/06–0643; G06Q 30/08; G06Q 50/01; H04N 21/2187; H04N 21/2542; H04N 21/47815; H04N 21/858
See application file for complete search history.

(56) References Cited

U.S. PATENT DOCUMENTS 8,682,739 B1 *   3/2014   Feinstein ........... G06Q 30/0641
                                                              705/26.1
11,100,554 B1 *  8/2021   Gupta ................ G06Q 30/0641
(Continued)

FOREIGN PATENT DOCUMENTS

KR            101895001 B1      9/2018

OTHER PUBLICATIONS www.shopping.naver.com [recovered from www.archive.org]. Screen shots dating Jul. 21, 2018 and Mar. 27, 2019. https://web.archive.org/web/20190327064716/https://shopping.naver.com/hotdeal/p/index.nhn (Year: 2019).*
(Continued)

*Primary Examiner* — William J Allen
(74) *Attorney, Agent, or Firm* — Greer Burns & Crain Ltd.

(57) ABSTRACT

A method for controlling a live content broadcast includes receiving, on a first online platform, information on a first set of products registered as products for sale of a user account associated with the user terminal, and receiving from a user, as a first user input, a selection of a second set of products to sell in the live content broadcast on a second online platform among the first set of products.

15 Claims, 14 Drawing Sheets

(51) Int. Cl.
*H04N 21/254* (2011.01)
*H04N 21/478* (2011.01)
*H04N 21/858* (2011.01)

(52) U.S. Cl.
CPC ... *H04N 21/2542* (2013.01); *H04N 21/47815* (2013.01); *H04N 21/858* (2013.01)

(56) References Cited

U.S. PATENT DOCUMENTS

| | | | |
|---|---|---|---|
| 11,200,740 B1* | 12/2021 | Samuel | G06F 3/0485 |
| 2012/0259687 A1* | 10/2012 | Kajamohideen | G06Q 30/0601 |
| | | | 705/347 |
| 2017/0262918 A1* | 9/2017 | Sweeney | G06Q 30/0643 |
| 2019/0268650 A1* | 8/2019 | Avedissian | G06F 3/0481 |
| 2020/0259876 A1* | 8/2020 | Evans | A63F 13/843 |
| 2022/0070514 A1* | 3/2022 | Li | G06Q 30/0643 |
| 2022/0191594 A1* | 6/2022 | Devoy, III | H04N 21/2187 |

OTHER PUBLICATIONS

Naver uses VisualOn Platform to power line TV application. (2016). Telecom Asia (Online), , n/a. Retrieved from https://dialog.proquest.com/professional/docview/1795785253?acountid=131444 (Year: 2016).*

* cited by examiner

METHOD AND DEVICE FOR CONTROLLING LIVE CONTENT STREAMING SERVICE

CROSS-REFERENCE TO RELATED APPLICATION

This application claims priority under 35 U.S.C § 119 to Korean Patent Application No. 10-2020-0181102, filed in the Korean Intellectual Property Office on Dec. 22, 2020, the entire contents of which are hereby incorporated by reference.

STATEMENT REGARDING PRIOR DISCLOSURES BY THE INVENTOR OR A JOINT INVENTOR

The following disclosures are submitted under 35 U.S.C. § 102(b)(1)(A): https://biz.chosun.com/site/data/html_dir/2020/03/08/2020030800951.html, Mar. 8, 2020; https://www.sedaily.com/News/NewsView/NewsPrint?Nid=1Z04B6B0P6, Mar. 8, 2020; https://blog.naver.com/PostPrint.nhn?blogId=naver shopping&logNo=222033638367, Jul. 17, 2020; https://news.naver.com/main/tool/print.nhn?oid=022&aid=0003487952, Jul. 26, 2020; https://blog.naver.com/PostPrint.nhn?blogId=naver_seller&logNo=222064764705, Aug. 19, 2020; https://blog.naver.com/PostPrint.nhn?blogID=naver_seller&logNo=222064767001, Aug. 19, 2020; https://blog.naver.com/PostPrint.nhn?blogId=naver_seller&logNo=222064769730, Aug. 19, 2020.

BACKGROUND OF THE INVENTION

Field of Invention

The present disclosure relates to a method and device for controlling live content broadcast, and more particularly, to a method and device for controlling live shopping broadcast by registering and changing products for sale and representative products on live shopping broadcast.

Description of Related Art

In recent years, a method for providing various online product information and a form of selling products, such as TV home shopping broadcasting, Internet shopping, catalog shopping, and so on have emerged to help consumers with shopping convenience. In particular, with the development of the Internet and mobile environment and the development of broadcast video production and video provision technologies, shopping mall operators or product sellers can easily produce and provide numerous product sales broadcast videos, and accordingly, consumers can receive numerous product information in various media such as texts, images, or videos and purchase products. For example, consumers can access live shopping channels through the Internet and watch product sales broadcast video being broadcast in real time, or consumers do not have to watch it during the corresponding broadcast time, since they can receive the recorded broadcast video later. Accordingly, consumers can receive information on various products in the form of online media regardless of time.

On the other hand, even when the products sold on live shopping broadcast are those that are also sold online, if the online shopping mall service and the live shopping broadcast service are not linked to each other, the sellers have the inconvenience of having to manually input information about the products to be introduced on live shopping broadcast. In addition, purchasers also have the inconvenience of purchasing products introduced on live shopping broadcast through phone calls, or having to find and directly access a separate online sales site.

BRIEF SUMMARY OF THE INVENTION

In order to solve the problems described above, the present disclosure provides a method for, a device for, and a computer program stored in a non-transitory recording medium for controlling live content broadcast.

The present disclosure may be implemented in a variety of ways, including a method, a device, or a computer program stored in a readable storage medium.

According to an embodiment, a method for controlling a live shopping broadcast may be provided, which may include receiving, on a first online platform, information on a first set of products registered as products for sale of a user account associated with the user terminal, receiving from a user, as a first user input, a selection of a second set of products to sell in the live shopping broadcast on a second online platform among the first set of products, and receiving from the user, as a second user input, a selection of a third set of products to be fixedly exposed on a live shopping broadcast screen on the second online platform among the second set of products.

According to an embodiment, a method for controlling a live shopping broadcast may be provided, which may include displaying a first set of products to sell in the live shopping broadcast on a display of the user terminal, receiving from a user a selection of a second set of products to be fixedly exposed on a live shopping broadcast screen among the first set of products, and transmitting a video captured by an image sensor of the user terminal and information on the second set of products.

According to an embodiment, a method for controlling a live shopping broadcast may be provided, which may include receiving, on a first online platform, information on a first set of products registered as products for sale of a user account associated with the user terminal, displaying information on the first set of products on a display of a user terminal, receiving from a user a selection of a second set of products to sell in the live shopping broadcast on a second online platform among the first set of products, transmitting a video captured by an image sensor of the user terminal and information on the second set of products to a second external device, in which the first online platform may be an online sales platform provided by a first external device, and the second online platform may be a live shopping broadcast platform provided by a second external device.

According to an embodiment, a method for controlling a live shopping broadcast may be provided, which may include receiving, on a first online platform, information on a first set of products registered as products for sale of a user account associated with the user terminal, receiving from a user a selection of a second set of products to sell in the live shopping broadcast on a second online platform among the first set of products, and transmitting information on the second set of products to a second external device associated with the second online platform.

A computer program is provided, which is stored in a computer-readable non-transitory recording medium for executing, on a computer, the method for controlling a live shopping broadcast according to an embodiment.

A device for controlling a live shopping broadcast control according to an embodiment may include a communication module, a memory, and one or more processors connected to the memory and configured to execute at least one computer-readable program included in the memory. The one or more programs may include instructions for receiving, on a first online platform, information on a first set of products registered as products for sale of a user account associated with the user terminal, receiving from a user, as a first user input, a selection of a second set of products to sell in the live shopping broadcast on a second online platform among the first set of products, and receiving from the user, as a second user input, a selection of a third set of products to be fixedly exposed on a live shopping broadcast screen on the second online platform among the second set of products.

According to various embodiments of the present disclosure, some or all of the products for sale registered on the online sales platform are provided to the live shopping broadcast platform, so that the seller can easily register the products for sale on the live shopping broadcast.

According to various embodiments of the present disclosure, a link for checking information on the products displayed on the purchaser terminal and purchasing the product is provided, so that the purchaser can easily purchase the products introduced in the live shopping broadcast.

According to various embodiments of the present disclosure, a product list is provided to the purchaser terminal based on the products for sale and the representative product registered in the live shopping broadcast platform, so that the seller can easily check the products on sale and select the representative product more effectively.

According to various embodiments of the present disclosure, the information on the representative product is fixedly exposed to the purchaser terminal, so that the purchaser can easily check the representative product currently being introduced in the live shopping broadcast, and easily move to a web page for purchasing the representative product.

According to various embodiments of the present disclosure, the types of information on the representative product fixedly exposed to the purchaser terminal are determined based on the number of the representative products, so that it is possible to provide as much information as possible in the limited space of the live shopping broadcast screen.

According to various embodiments of the present disclosure, the seller can select some or all of the products on sale or the representative product in the online sales shopping, so that the seller can easily change the products for sale or the representative product during the live shopping broadcast.

According to various embodiments of the present disclosure, the seller can easily check that the product he or she is currently selling in the live shopping broadcast is changed.

According to various embodiments of the present disclosure, an icon on the list of products for sale provided by the online sales platform is displayed, so that it is possible to easily check the products for sales and the representative products in the live shopping broadcast on the online sales platform.

According to various embodiments of the present disclosure, the seller terminal receives information on the sales quantity and the remaining quantity of the products for sale on the live shopping broadcast, so that the seller can easily check the status of the sales quantity and the remaining quantity of products on sale on the live shopping broadcast and maximize the sales quantity.

According to various embodiments of the present disclosure, the seller can schedule a live shopping broadcast to start at a future time point and receives a notification, so that the seller can start the live shopping broadcast without a separate request for initiation and without missing the scheduled live shopping broadcast.

BRIEF DESCRIPTION OF THE DRAWINGS

Embodiments of the present disclosure will be described with reference to the accompanying drawings described below, where similar reference numerals indicate similar elements, but are not limited thereto, in which.

DETAILED DESCRIPTION OF THE INVENTION

Figure 1:
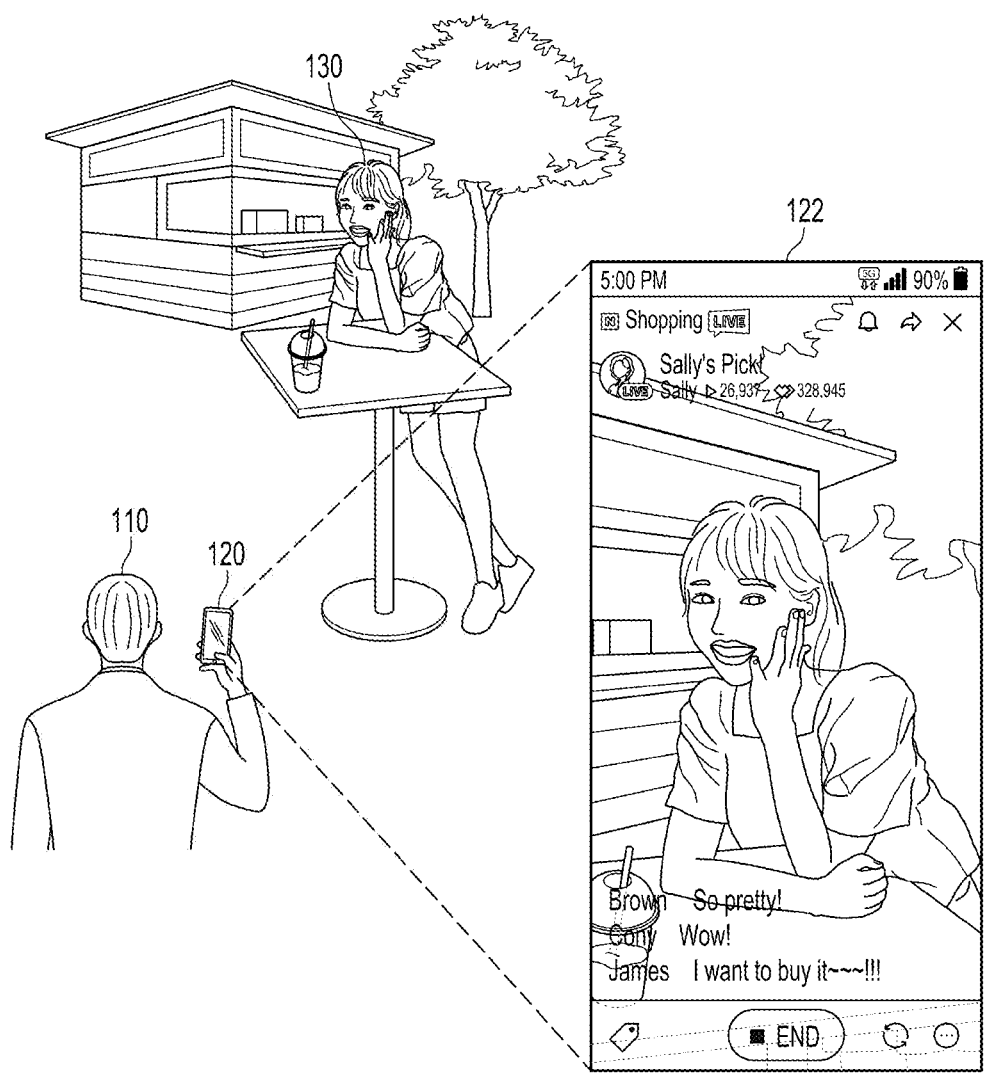
FIG. 1 illustrates an example diagram in which a first user captures a live shopping broadcast featuring a second user, using a user terminal according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of those skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment of the present disclosure, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, the "live shopping broadcast" or "live content broadcast" may refer to a broadcast in which a seller can share with viewers the videos captured in real time using a user terminal such as a smartphone, a tablet, and the like, and sell the products for sale while communicating with the viewers about the products.

In the present disclosure, the "online platform" may refer to an online environment built such that a plurality of groups, such as suppliers, consumers, and the like participate in and exchange the values each group wants to acquire through transactions. For example, the "online sales platform" may be an online environment built such that sellers who want to sell products and purchaser who want to purchase the products participate, so that the sale and purchase of the products are performed online. As another example, the "live shopping broadcast platform" or "live content broadcast platform" is an online environment built such that the sellers who shoot the live shopping broadcast and the purchasers who watch the live shopping broadcast participate, so that real-time introduction of the products and sales and purchase of the products are performed online.

In the present disclosure, "fixedly exposed" may refer to certain information being displayed on a fixed area of a display (e.g., a display of a smartphone, a display of a tablet, and the like) without being occluded by other contents. In this example, the "fixed area" may mean that the corresponding area being fixed in certain size, position, shape, and the like.

In the present disclosure, the "representative product" may refer to a product among the products on sale which is set by the seller to be fixedly exposed on a specific area of a live shopping broadcast screen displayed on a purchaser terminal in the live shopping broadcast. For example, the seller may set a product currently being introduced in the live shopping broadcast as the representative product in order to preferentially promote the same.

FIG. 1 illustrates an example in which a first user 110 captures a live shopping broadcast featuring a second user 130, using a user terminal 120 according to an embodiment. As illustrated, the first user 110 may capture an image of the second user 130 using various sensors (e.g., image sensor, sound sensor, and the like) of the user terminal 120 (e.g., a seller terminal). Specifically, the first user 110 may capture the image of the second user 130 using the user terminal 120 so as to generate a video for promoting and selling products through the live shopping broadcasting, and transmit the video to an external device. In this process, a user interface 122 for shooting and controlling a live shopping broadcast may be displayed on the display of the user terminal 120. In an embodiment, an image sensor and a sound sensor embedded in the user terminal 120 or an image sensor and a sound sensor connected by wire or wirelessly to the user terminal 120 may be used to shoot a live shopping broadcast.

The first user 110 may log in to the live shopping broadcast platform using a user account (e.g., a seller account) created in advance. After logging in, the first user 110 may start a live shopping broadcast or schedule a live shopping broadcast to start at a specific time. In order to register a product for introduction or sale in the live shopping broadcast, the first user 110 may log in to the online sales platform using the user account (e.g., the seller account) created in advance. In this case, the first user 110 may easily register the products for sale in the live shopping broadcast by selecting some or all of the products for sale previously registered by himself in the online sales platform (e.g., online shopping mall).

When the live shopping broadcast is started, the user terminal 120 may transmit the captured video to a server (or an external device) associated with the live shopping broadcast platform. In this case, the server associated with the live shopping broadcast platform may transmit the video received from the user terminal 120 to the purchaser terminals watching the live shopping broadcast. In this case, the server associated with the live shopping broadcast platform may also transmit information on the products registered by the first user 110 as the products for sale in the live shopping broadcast, and links for purchasing the products to the purchaser terminals that are currently watching. The purchasers can easily purchase the products introduced in the live shopping broadcast using the information on the product displayed on the purchaser terminals and the links for purchasing the products.

The first user 110 may select a representative product to be fixedly exposed on the live shopping broadcast screen such that the purchasers can easily check and purchase the products currently being introduced in the live shopping broadcast. In this case, the information on the selected representative product may be displayed at the bottom of the live shopping broadcast screen displayed on the display of the purchaser terminal. In this case, the purchasers can move to the web pages on the online sales platform where they can purchase the corresponding product, by selecting the fixed exposure product (representative product) displayed on the purchaser terminals by a touch input or the like.

Figure 2:
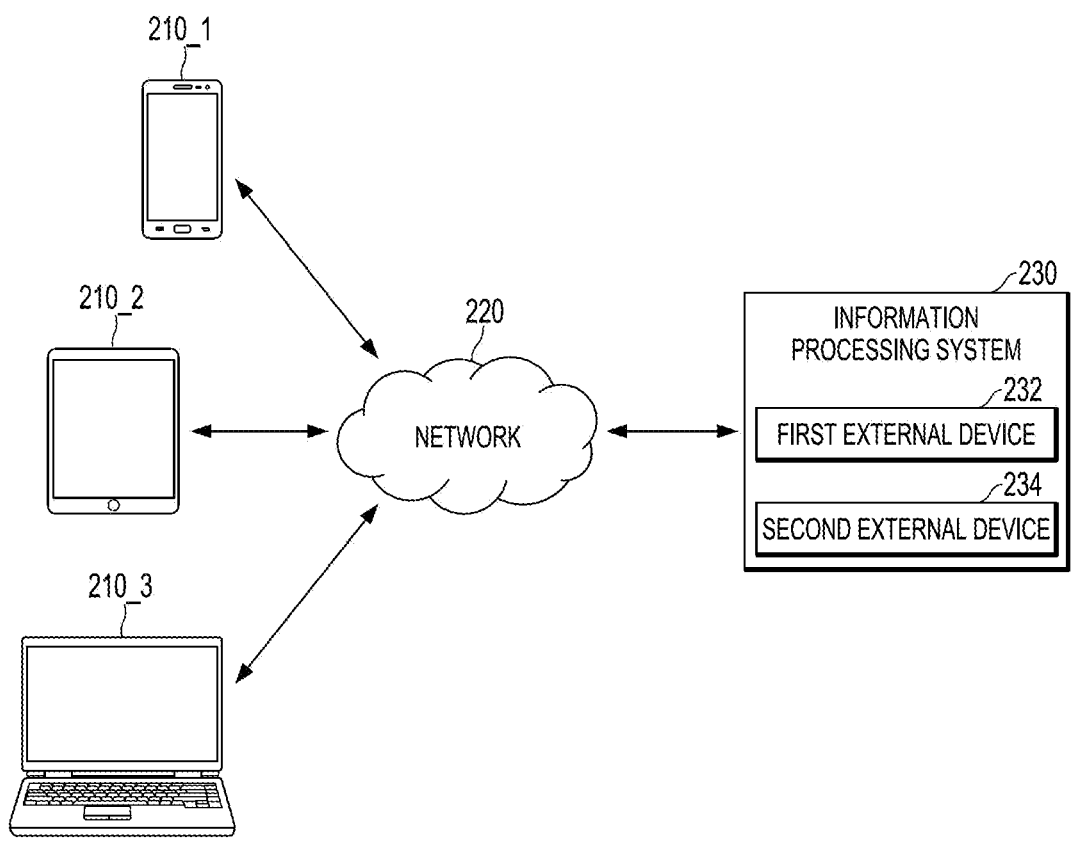
FIG. 2 is a schematic diagram illustrating a configuration in which an information processing system is communicatively connected with a plurality of user terminals in order to provide a live shopping broadcast service and an online sales service according to an embodiment.

FIG. 2 is a schematic diagram illustrating a configuration in which an information processing system 230 is communicatively connected to a plurality of user terminals 210_1, 210_2 and 210_3 to provide a live shopping broadcast service and an online sales service according to an embodiment. The information processing system 230 may include system(s) capable of providing a live shopping broadcast service (platform) and an online sales service (platform) through the network 220. In an embodiment, the information processing system 230 may include a first external device 232 for providing an online sales service (platform) and a second external device 234 for providing a live shopping broadcast service (platform). According to an embodiment, the information processing system 230 may include one or more server devices and/or databases, or one or more distributed computing devices and/or distributed databases based on cloud computing services, which can store, provide and execute computer-executable programs (e.g., downloadable applications) and data associated with the online sales service and the live shopping broadcast service. For example, the information processing system 230 may include separate systems (e.g., servers) for providing the live shopping broadcast service and the online sales service (platform).

The live shopping broadcast service provided by the information processing system 230 may be provided to the user through an application for live shopping broadcast or a web browser application installed in each of the plurality of user terminals 210_1, 210_2 and 210_3. The online sales service provided by the information processing system 230 may be provided to the user through an application for online sales or a web browser application installed in each of the plurality of user terminals 210_1, 210_2 and 210_3.

The plurality of user terminals 210_1, 210_2 and 210_3 may communicate with the information processing system 230 through the network 220. The network 220 may be configured to enable communication between the plurality of user terminals 210_1, 210_2 and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2 and 210_3.

In FIG. 2, a mobile phone terminal 210_1, a tablet terminal 210_2, and a PC terminal 210_3 are illustrated as the examples of the user terminals, but are not limited thereto, and the user terminals 210_1, 210_2 and 210_3 may be any computing device that is capable of wired and/or wireless communication and that can be installed with an application for live shopping broadcast, a web browser application, and the like and execute the same. For example, the user terminals may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 shows that three user terminals 210_1, 210_2 and 210_3 are in communication with the information processing system 230 through the network 220, but the present disclosure is not limited thereto, and a different number of user terminals may be configured to be in communication with the information processing system 230 through the network 220. The plurality of user terminals 210_1, 210_2 and 210_3 may be the seller terminal or the purchaser terminal.

In an embodiment, the information processing system 230 may receive media data (e.g., photos, videos, texts, and the like) input from the seller terminal through an application for live shopping broadcast or the like running on the seller terminal. After that, the information processing system 230 may store the received media data and/or transmit it to a viewer/purchaser terminal connected to the network 220.

Additionally, the information processing system 230 may control the live shopping broadcast based on a user input from the seller terminal.

Figure 3:
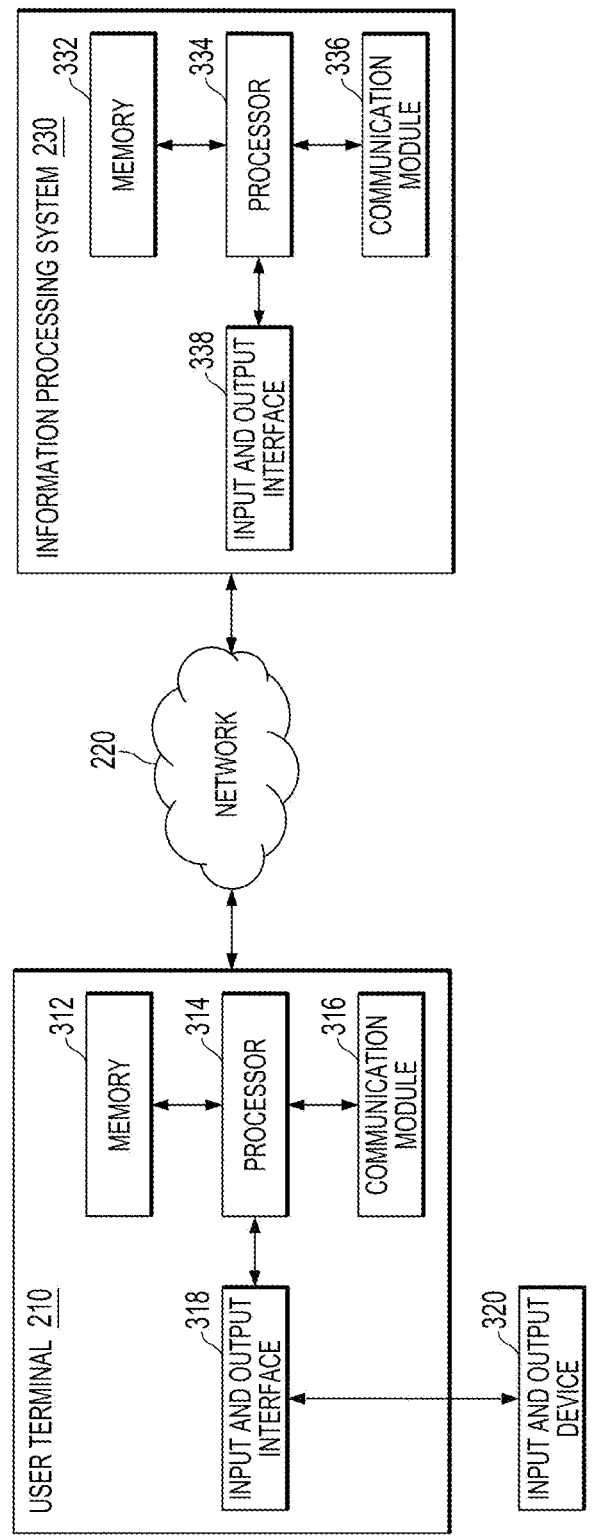
FIG. 3 is a block diagram illustrating the internal configuration of the user terminal and an information processing system according to an embodiment.

FIG. 3 is a block diagram illustrating an internal configuration of the user terminal 210 and the information processing system 230 according to an embodiment. The user terminal 210 may refer to any computing device that is capable of executing an application for live shopping broadcast, a web browser application, and the like, and capable of wired and wireless communication, and may include the mobile phone terminal 210_1, the tablet terminal 210_2, and the PC terminal 210_3 of FIG. 2, and the like. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As shown in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for the live shopping broadcast application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program (for example, the application for live shopping broadcast) installed by files provided by developers or a file distribution system for distributing an installation file of the application through the network 220.

The processors 314 and 334 may be configured to process instructions of the computer program by performing basic arithmetic, logic, and input and output operations. The instructions may be provided to the processors 314 and 334 from the memories 312 and 332, respectively, or the communication modules 316 and 336, respectively. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., request, video data, and the like to control the live shopping broadcast) generated by the processor 314 of the user terminal 210 according to the program code stored in the recording device such as the memory 312 or the like may be transmitted to the information processing system 230 through the network 220 under the control of the communication module 316. Conversely, a control signal or instructions provided under the control of the processor 334 of the information processing system 230 may be received by the user terminal 210 through the communication module 316 of the user terminal 210 via the communication module 336 and the network 220. For example, the user terminal 210 may receive chat information, sales quantity information, and the like of the viewers from the information processing system 230 through the communication module 316.

The input and output interface 318 may be a means for interfacing with the input and output device 320. As an example, the input device of the input and output device 320 may include a device such as a camera, a keyboard, a microphone, and a mouse, which includes an audio sensor and/or an image sensor. The output device of the input and output device 320 may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded in the memory 312, the live shopping broadcast screen or the information on the products registered in the online sales platform or the like, which is configured with the information and/or data provided by the information processing system 230 or another user terminal, may be displayed on the display through the input and output interface 318. While FIG. 3 illustrates that the input and output device 320 is not included in the user terminal 210, embodiment is not limited thereto, and the input and output device 320 may be configured as one device with the user terminal 210. In addition, the input and output interface 338 of the information processing system 230 may be a means for interfacing with a device (not illustrated) for inputting or outputting, which may be connected to the information processing system 230 or included in the information processing system 230. In FIG. 3, the input and output interfaces 318 and 338 are illustrated as the components configured separately from the processors 314 and 334, but embodiment is not limited thereto, and the input and output interfaces 318 and 338 may be configured to be included in the processors 314 and 334, respectively.

The user terminal 210 and the information processing system 230 may include more components than the components illustrated in FIG. 3. For example, the user terminal 210 may be implemented to include at least a part of the input and output devices 320 described above. In addition, the user terminal 210 may further include other components such as a transceiver, a global positioning system (GPS)

module, a camera, various sensors, a database, and the like. For example, when the user terminal 210 is a smartphone, it may generally include components included in the smartphone, such as an acceleration sensor, a gyro sensor, a camera module, various physical buttons, buttons using a touch panel, input and output ports, a vibrator for vibration, and so on are further included in the user terminal 210.

According to an embodiment, the processor 314 of the user terminal 210 may be configured to run a search application, an application for live shopping broadcast, or a web browser application. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication module 316, and process the received information and/or data and store it in the memory 312. In addition, such information and/or data may be provided to the information processing system 230 through the communication module 316.

While the search application, the application for live shopping broadcast, or the web browser application is running, the processor 314 may receive text, image, video, and the like input or selected through the input device such as a camera, a microphone, and the like including a touch screen, a keyboard, an audio sensor and/or an image sensor connected to the input and output interface 318, and store the received text, image, and/or video or the like in the memory 312, or provide it to the information processing system 230 through the communication module 316 and the network 220. According to an embodiment, the processor 314 may provide, through the input device, the video captured on the search application, the application for live shopping broadcast or the web browser application, the user input, and the like to the information processing system 230 through the network 220 and the communication module 316.

The processor 334 of the information processing system 230 may be configured to manage, process, and/or store the information and/or data received from a plurality of user terminals 210 and/or a plurality of external systems. According to an embodiment, the processor 334 may store, process, and transmit the video received from the user terminal 210. Additionally or alternatively, the processor 334 may control the live shopping broadcast in response to the user input received from the user terminal 210.

Figure 4:
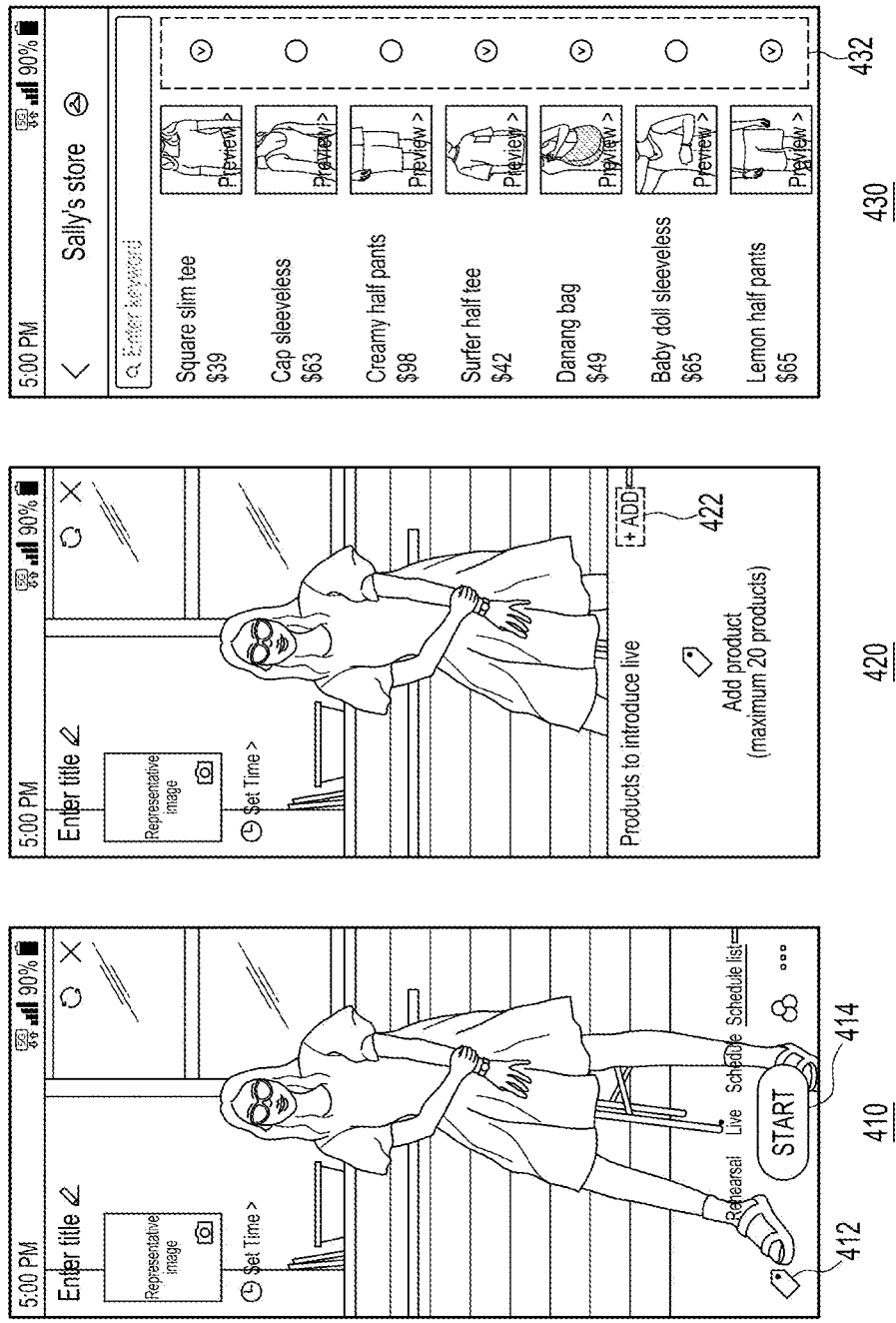
FIG. 4 illustrates an example diagram in which a seller registers products for sale in a live shopping broadcast according to an embodiment.

FIG. 4 illustrates an example in which the seller registers the products for sale in the live shopping broadcast according to an embodiment. FIG. 4 illustrates a first operation step 410, a second operation step 420, and a third operation step 430 of the user terminal 210 being used as a seller terminal 210. The first operation step 410 shows a first icon 412 for checking a list of products for sale in the live shopping broadcast, and a second icon 414 for initiating the live shopping broadcast being displayed on the seller terminal 210. The user (e.g., the seller) may select the first icon 412 by a touch input or the like in order to check, register, or change the products for sale in the live shopping broadcast. Alternatively or additionally, the user may select the second icon 414 to initiate the live shopping broadcast.

The second operation step 420 shows the list of products registered as the products for sale in the live shopping broadcast being displayed on the seller terminal 210 in response to the user selecting the first icon 412. When the products for sale on the live shopping broadcast are not yet registered, as illustrated, a message stating "Add products (maximum 20 products)" may be displayed on the seller terminal 210. In addition, a third icon 422 for adding the products for sale in the live shopping broadcast may also be displayed on the seller terminal 210.

The third operation step 430 shows the information on the product registered on the online sales platform as the user's products for sale being displayed on the seller terminal 210 in response to the user selecting the third icon 422. In this example, the online sales platform may be a platform separate from the live shopping broadcast platform, and the user may log in to the online sales platform and the live shopping broadcast platform using the same user account. Alternatively, different user accounts can be used to log in to the online sales platform and the live shopping broadcast platform. For example, 7 products ("Square slim tee", "Cap sleeveless", "Creamy half pants", "Surfer half tee", "Danang bag", "Baby doll sleeveless" and "Lemon half pants") may be registered in advance as the products for sale in the user's online store (Sally's store) in the online sales platform. The user may select some or all of the products registered as his/her products for sale in the online sales platform by using check boxes in a screen area 432 and add the selected products as the products for sale in the live shopping broadcast. For example, when the user selects "Square slim tee", "Surfer half tee", "Danang bag" and "Lemon half pants", viewers can check and purchase these four products during the live shopping broadcast.

According to an embodiment, the seller terminal 210 may directly access the online sales platform to acquire the information on the products for sales registered in the online sales platform. According to another embodiment, the seller terminal 210 may acquire the information on the products for sales registered in the online sales platform through the live shopping broadcast platform. With such a configuration, the seller of the live shopping broadcast can easily register the products for sale in the live shopping broadcast by using the product information registered in the online store without having to manually input and upload the information on the products for sale in the broadcast.

Figure 5:
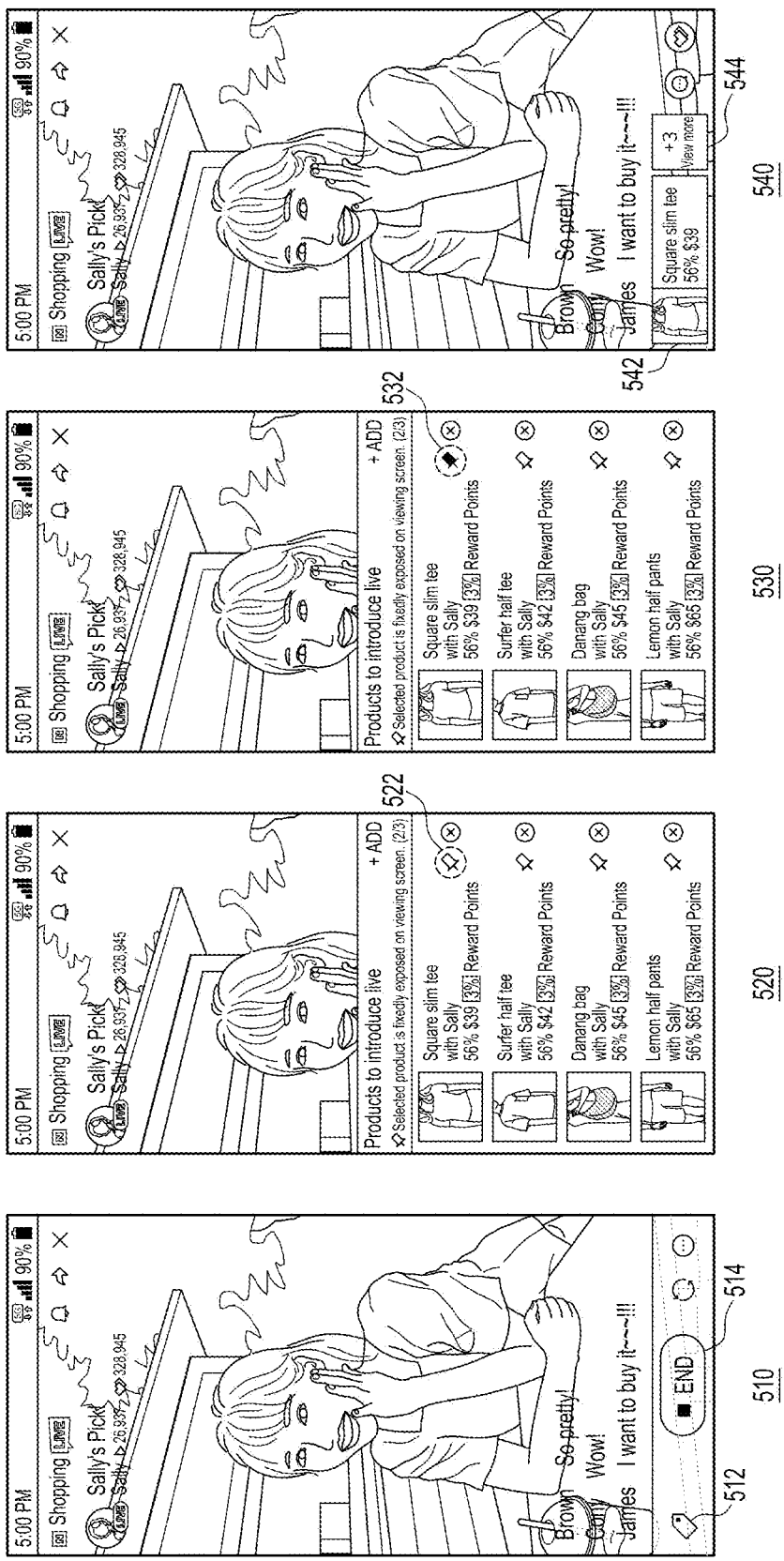
FIG. 5 illustrates an example diagram in which a seller registers a representative product to be fixedly exposed on the live shopping broadcast according to an embodiment.

FIG. 5 illustrates an example in which the seller registers a representative product to be fixedly exposed on the live shopping broadcast according to an embodiment. FIG. 5 illustrates a first operation step 510, a second operation step 520 and a third operation step 530 of the seller terminal 210, and a fourth operation step 540 of the purchaser terminal, i.e., another user terminal. The first operation step 510 shows a first icon 512 for checking a list of products for sale in the live shopping broadcast, and a second icon 514 for ending the live shopping broadcast being displayed on the seller terminal 210. The seller may select the first icon 512 by a touch input or the like in order to select a representative product to be fixedly exposed on the live shopping broadcast screen among the products on sale in the live shopping broadcast. Alternatively, the seller may select the second icon 514 to end the live shopping broadcast currently in progress.

The second operation step 520 shows the list of products on sale in the live shopping broadcast being displayed on the seller terminal 210 in response to the seller selecting the first icon 512. For example, the products "Square slim tee", "Surfer half tee", "Danang bag", and "Lemon half pants" that the seller has previously registered as the products for sale in the live shopping broadcast may be displayed on the seller terminal 210. According to an embodiment, the order of displaying the products for sale on the display may be determined based on information on the quantity of sales of each product for sale. For example, during a live broadcast, the products for sales may be sorted and displayed in the order of a larger quantity sold.

According to another embodiment, the order of displaying the products for sale on the display may be determined based on a result of comparison between representative images of the products for sale and an image captured by the seller terminal 210. For example, the order of displaying the products for sale on the display may be determined based on a similarity score between the representative image of the product for sale and the image captured by the seller terminal 210. Additionally or alternatively, the order of displaying the products for sale on the display may be determined based on a result of object recognition of the representative image of the product for sale and the image captured by the seller terminal 210. With such a configuration, the seller can select the representative product more effectively.

The third operation step 530 shows a third icon 522 being changed to a fourth icon 532 and displayed, in response to the user selecting the third icon 522 for registering "Square slim tee" as a representative product. The fourth icon 532 may be an icon having a color, a shape, a position, and the like that is different from the third icon 522 so as to be distinguished from the third icon 522. With such a configuration, the seller can easily check the products on sale in the corresponding live shopping broadcast and easily select a representative product from among the products on sale.

The fourth operation step 540 shows the information about the representative product ("Square slim tee") being fixedly exposed in a first area 542 of the live shopping broadcast screen displayed on the purchaser terminal, and shows the information about the number of products on sale in the live shopping broadcast being fixedly exposed in a second area 544, in response to the user selecting the third icon 522. The information on the representative product displayed in the first area 542 may include a representative image, a product name, a discount rate, a price, and the like. According to an embodiment, in response to receiving a user input on the first area 542, the purchaser terminal may display a web page for purchasing the representative product ("Square slim tee") on the display. Here, the web page for purchasing the representative product may be a web page stored in the online sales platform.

Additionally or alternatively, in response to receiving a user input on the second area 544, the purchaser terminal may display, on the display, the products registered by the seller as the products for sale in the corresponding live shopping broadcast. For example, the information about the products "Square slim tee", "Surfer half tee", "Danang bag", and "Lemon half pants" registered by the seller as the products for sale may be displayed on the display of the purchaser terminal. By selecting one of the products displayed on the screen, the purchaser can move to the web page for purchasing the corresponding product. Here, the web page for purchasing the product may be a web page stored in the online sales platform. As illustrated, the number (+3) displayed in the second area 544 may represent a number of products for sale (4) of the corresponding live shopping broadcast subtracted by the number of representative products (1) selected by the seller.

With such a configuration, the purchaser can easily check the representative product currently being introduced by the seller in the live shopping broadcast. In addition, by selecting the representative product that is fixedly exposed on the live shopping broadcast screen, the purchaser can move directly to the web page for purchasing the representative product.

Figure 6:
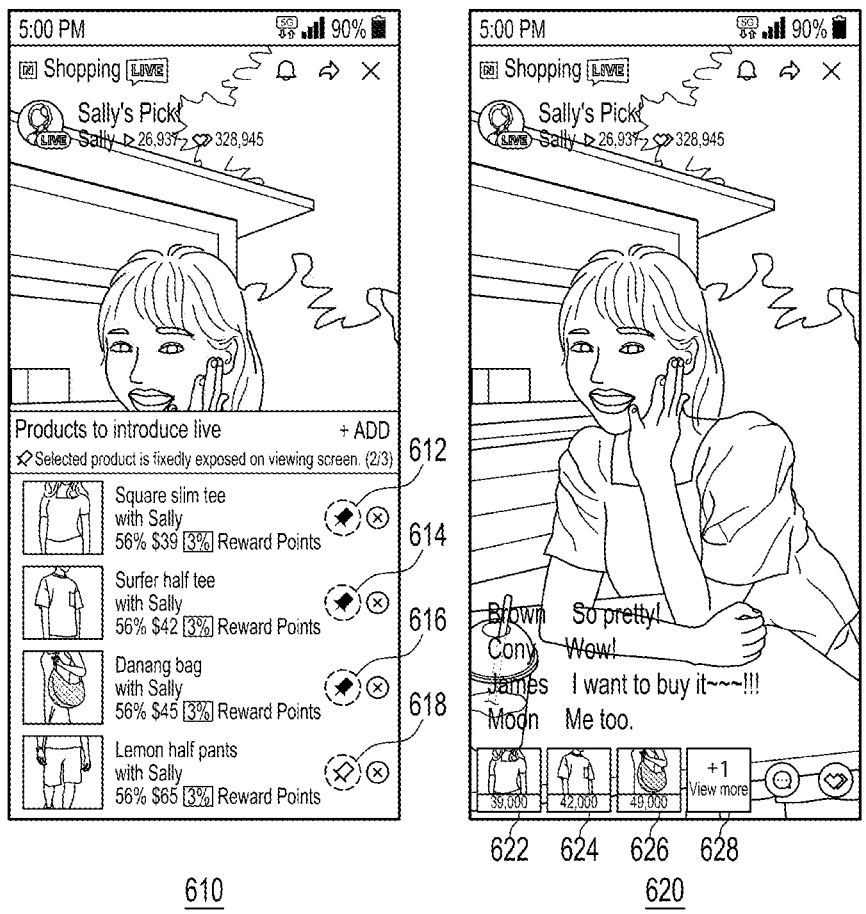
FIG. 6 illustrates an example diagram in which types of information on representative products displayed on the live shopping broadcast screen are determined according to the number of representative products according to an embodiment.

FIG. 6 illustrates an example in which the types of information on the representative products displayed on the live shopping broadcast screen are determined according to the number of representative products according to an embodiment. FIG. 6 illustrates a first operation step 610 of the seller terminal 210 and a second operation step 620 of the purchaser terminal. The first operation step 610 shows first to third icons 612, 614 and 616 being displayed on three representative products selected by the seller. In this example, the first to third icons 612, 614 and 616 may indicate that the corresponding products are the representative products that are fixedly exposed on the live shopping broadcast screen.

The second operation step 620 shows the information on the representative products being fixedly exposed on a first area 622, a second area 624, and a third area 626 of the live shopping broadcast screen displayed on the purchaser terminal, in response to the seller selecting three representative products. According to an embodiment, the types of the information on the representative products fixedly exposed on the live shopping broadcast screen may be determined based on the number of representative products selected by the seller. For example, when there are two or three representative products, a representative image and price for each representative product may be fixedly exposed. Alternatively, when there is one representative product, the representative image, product name, discount rate, and price for each representative product may be fixedly exposed. With such a configuration, it is possible to provide as much information as possible to help the purchaser decide a product to purchase, in a limited space of the live shopping broadcast screen displayed on the purchaser terminal.

According to an embodiment, in response to receiving a user input on the first area 622, the purchaser terminal may display on the display a web page for purchasing the first representative product. Alternatively or additionally, in response to receiving a user input on the second area 624, the purchaser terminal may display on the display a web page for purchasing a second representative product. Alternatively or additionally, in response to receiving a user input on the third area 626, the purchaser terminal may display on the display a web page for purchasing a third representative product.

According to an embodiment, in response to receiving a user input on a fourth area 628, the purchaser terminal may display on the display a product registered by the seller as the product for sale in the corresponding live shopping broadcast. For example, on the display of the purchaser terminal, the information on the representative products "Square slim tee", "Surfer half tee", and "Danang bag" products, as well as the information on the non-representative product "Lemon half pants" may be displayed. By selecting one of the products displayed on the screen, the purchaser can move to the web page for purchasing the corresponding product.

FIG. 6 illustrates that the seller has selected three representative products, but the embodiment is not limited thereto. For example, the seller may select some of the first to third icons 612, 614 and 616 by a touch input or the like to un-select some of the representative products. Additionally or alternatively, the seller may select the fourth icon 618 by a touch input or the like to add non-representative products for sale as the representative product.

Figure 7:
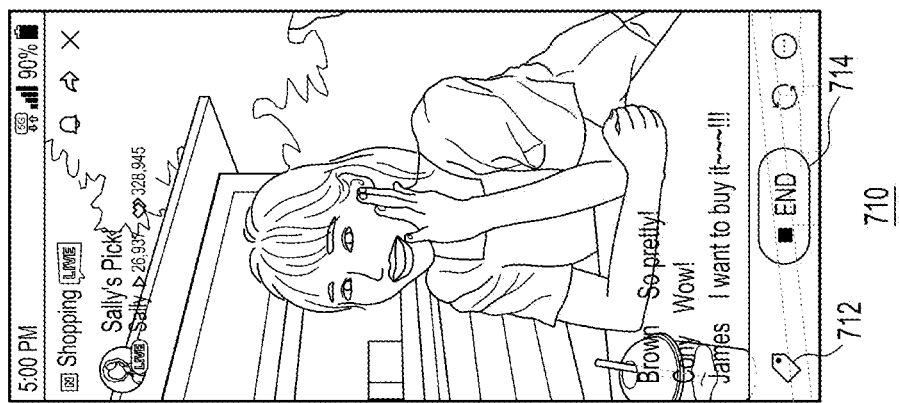
FIG. 7 illustrates an example diagram in which a seller removes a product on sale in a live shopping broadcast according to an embodiment.
Figure 7:
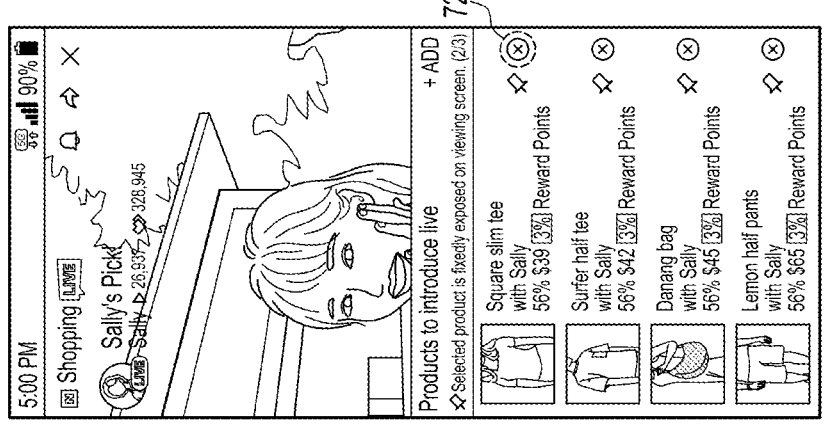
Figure 7:
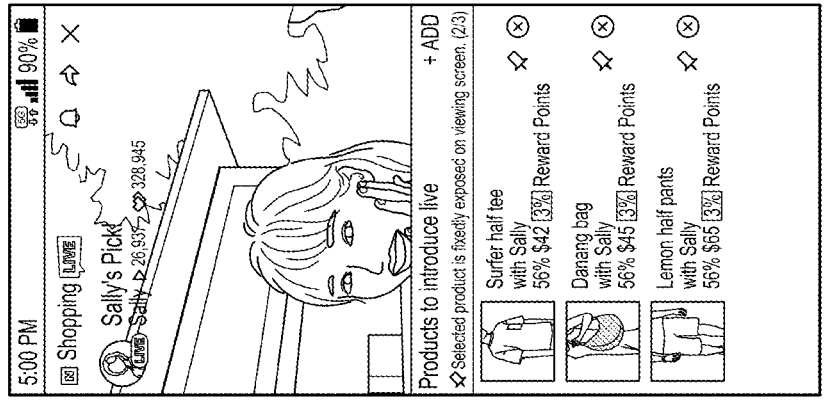

FIG. 7 illustrates an example in which a seller removes a product on sale in a live shopping broadcast according to an embodiment; FIG. 7 illustrates a first operation step 710, a second operation step 720, and a third operation step 730 of the seller terminal 210. The first operation step 710 shows a first icon 712 for checking a list of products for sale in the live shopping broadcast, and a second icon 714 for ending the live shopping broadcast being displayed on the seller terminal 210. The seller may select the first icon 712 by a touch input or the like in order to check, register, or change the products for sale in the live shopping broadcast.

The second operation step 720 shows a list of products on sale in the live shopping broadcast being displayed on the display of the seller terminal 210 in response to the seller selecting the first icon 712. In this case, the seller may remove some of the previously registered products for sales. For example, the seller may select a second icon 722 by a touch input or the like so that the seller may delete the "Square slim tee" from the products for sale.

The third operation step 730 shows the "Square slim tee" has been removed from the products for sale in response to the seller selecting the second icon 722. As the seller removes and deletes the products for sale during the live shopping broadcast, the list of products for sale displayed on the purchaser terminal may be changed. In addition, when the products for sale deleted by the seller is the representative product, the product may also be removed from the representative product list.

Figure 8:
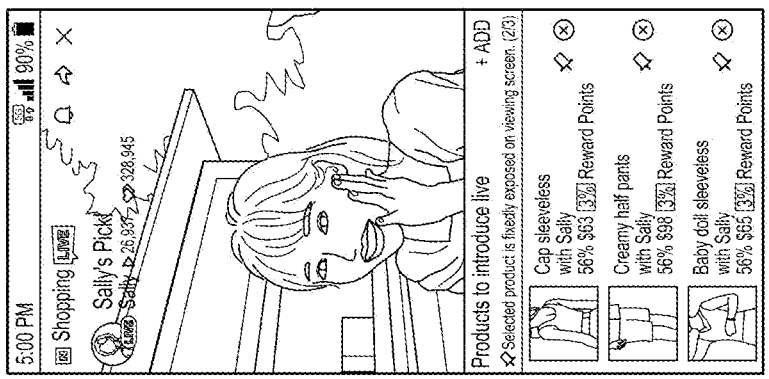
FIG. 8 illustrates an example diagram in which a seller changes a product on sale in a live shopping broadcast according to an embodiment.
Figure 8:
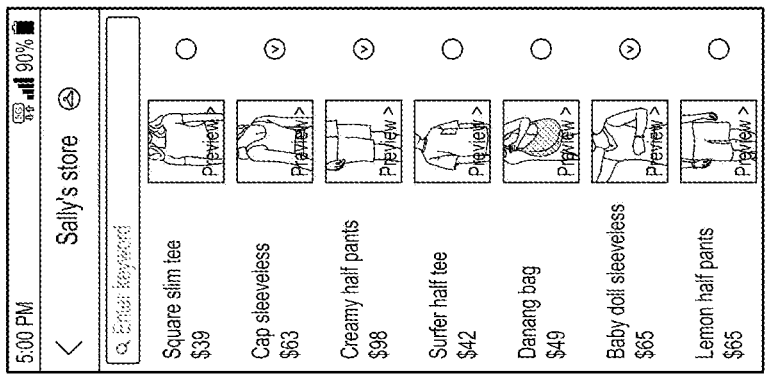
Figure 8:
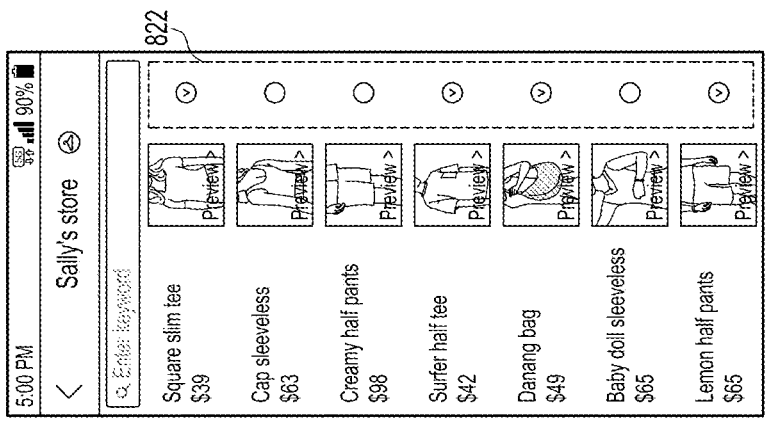
Figure 8:
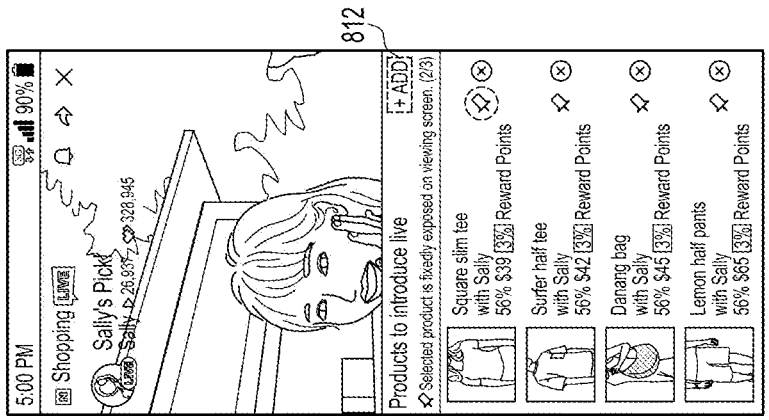

FIG. 8 illustrates an example in which the seller changes the product on sale in the live shopping broadcast according to an embodiment. FIG. 8 illustrates the first operation step 810 to the fourth operation step 840 of the seller terminal 210. The first operation step 810 shows a list of products on sale in the live shopping broadcast being displayed on the display of the seller terminal 210. As illustrated, a first icon 812 for adding or changing the products for sale may be displayed together with the list of products on sale in the live shopping broadcast. According to an embodiment, the seller may select the first icon 812 by a touch input or the like to change the products for sale during the live shopping broadcast.

The second operation step 820 shows the information on the product registered on the online sales platform as the seller's products for sale being displayed on the seller terminal 210 in response to the seller selecting the first icon 812. In this example, the online sales platform may be a platform separate from the live shopping broadcast platform, and the seller may log in to the online sales platform and the live shopping broadcast platform using the same user account. The seller may change the product on sale in the live shopping broadcast by using a check box or the like in a screen area 822. For example, the seller may change the products for sale in the live shopping broadcast by un-selecting the product currently being sold on the live shopping broadcast or by selecting a product not currently being sold.

The third operation step 830 shows that the products for sale of the live shopping broadcast have been changed in response to the seller selecting the check box displayed on the screen area 822 by a touch input or the like. As illustrated, the products for sale in the live shopping broadcast can be changed from "Square slim tee", "Surfer half tee", "Danang bag" and "Lemon half pants" to "Cap sleeveless", "Creamy half pants" and "Baby doll sleeveless". In this case, as the seller changes the products for sale, the list of the products for sale displayed on the purchaser terminal may be changed. With such a configuration, the seller can easily change the products for sale during the live shopping broadcasting by selecting some or all of the products for sale registered in the online sales platform (e.g., online shopping mall).

The fourth operation step 840 shows the list of products on sale in the live shopping broadcast being changed and displayed on the display of the seller terminal 210 in response to the seller changing the products for sale in the live shopping broadcast. As illustrated, the products for sale included in the list of the products for sale may be changed from "Square slim tee", "Surfer half tee", "Danang bag" and "Lemon half pants" to "Cap sleeveless", "Creamy half pants" and "Baby doll sleeveless". With such a configuration, the seller can easily check that the product he or she is currently selling in the live shopping broadcast has changed.

Figure 9:
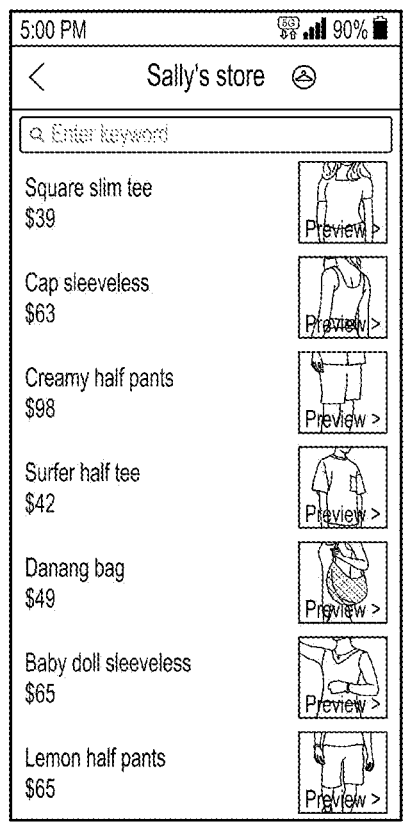
FIG. 9 illustrates an example diagram in which an order of displaying products for sale registered on an online sales platform is changed according to the products for sale/representative product selected by the seller according to an embodiment.
Figure 9:
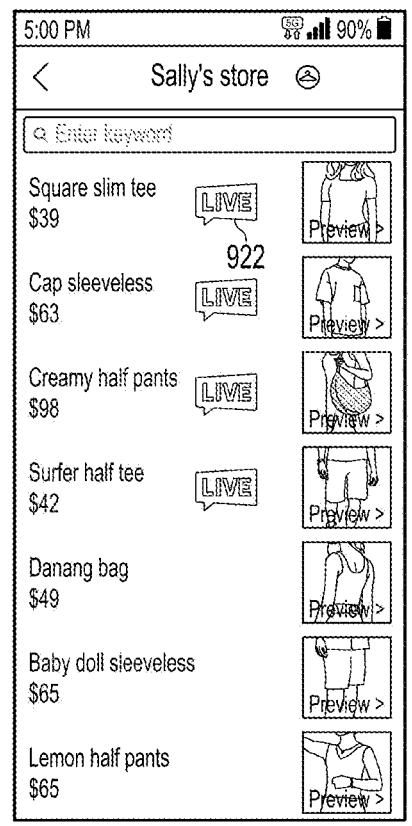

FIG. 9 illustrates an example in which the order of displaying the products for sale registered on the online sales platform is changed according to the products for sale/representative product selected by the seller according to an embodiment. FIG. 9 illustrates a first operation step 910 and a second operation step 920 of the purchaser terminal. The first operation step 910 shows an online store screen of the seller (Sally) being displayed on the purchaser terminal before the seller (Sally) starts a live shopping broadcast. The online store of the seller (Sally) may be an online store registered on an online sales platform different from the live shopping broadcast platform.

The second operation step 920 shows the online store screen of the seller (Sally) being displayed on the purchaser terminal after the seller (Sally) starts the live shopping broadcast. As illustrated, in response to the seller (Sally) registering the products for sale or the representative product in the live shopping broadcast, the order of displaying the products in the online store of the seller (Sally) may be changed. For example, the products currently registered as the products for sale or the representative products in the live shopping broadcast may be preferentially displayed, and an icon 922 may be displayed on the corresponding product, indicating that the products on sale in the live shopping broadcast. In addition, an additional icon (not illustrated) may be displayed on the product currently registered as the representative product in the live shopping broadcast, indicating that the product is registered as the representative product in the live shopping broadcast.

With such a configuration, the seller can promote the products for sale and the representative product of the live shopping broadcast to the purchaser connected to the online sales platform, and the purchaser can easily check the products and the representative products that the seller is selling in the live shopping broadcast among the products registered on the online sales platform. Additionally, an icon or area (not illustrated) indicating that the seller (Sally) is doing a live shopping broadcast may be displayed on the online store screen of the seller (Sally), and the user (purchaser) may start viewing the live shopping broadcast of the seller (Sally) by selecting the corresponding icon or area.

Figure 10:
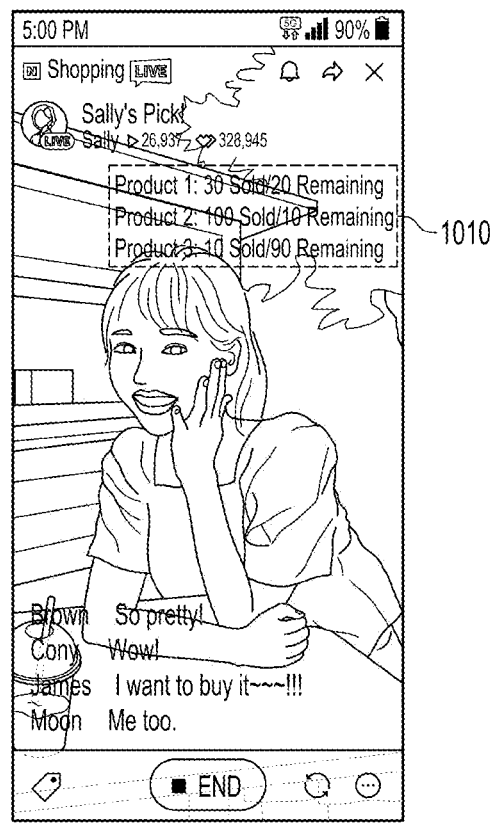
FIG. 10 illustrates an example diagram of displaying, on a seller terminal, information on a sales quantity of a product on sale in a live shopping broadcast according to an embodiment.

FIG. 10 illustrates an example of displaying, on a seller terminal 210, information on the sales quantity of the products on sale in the live shopping broadcast according to an embodiment. As illustrated, the information on the sales quantity and the remaining quantity of the products on sale in the live shopping broadcast may be displayed in a screen area 1010. According to an embodiment, the seller terminal 210 may receive the information on the sales quantity and the remaining quantity of the products on sale in the live shopping broadcast from an external device associated with the online sales platform. Alternatively, the seller terminal 210 may receive the information on the sales quantity and the remaining quantity of the products on sale in the live shopping broadcast from an external device associated with the live shopping broadcast.

According to an embodiment, the information on the sales quantity and the remaining quantity may be displayed on the screen area 1010 for all products on sale in the live shopping broadcast. According to another embodiment, the information on the sales quantity and the remaining quantity may be displayed on the screen area 1010 for n products (where n is a natural number) that are sold most among all products sold in the live shopping broadcast. According to another embodiment, the information on the sales quantity and the remaining quantity may be displayed on the screen area 1010 for n products (where n is a natural number) with the lowest remaining quantity among all products on sale in the live shopping broadcast.

With such a configuration, the seller can easily check the current status of the sales quantity and the remaining quantity of the products on sale in the live shopping broadcast, and based on this, can consider changes to the products for sale, the representative product, and the like. For example, the seller may maximize product sales in the live shopping broadcast by excluding products with a small remaining quantity from the representative products and selecting the products with a large remaining quantity as the representative product.

Figure 11:
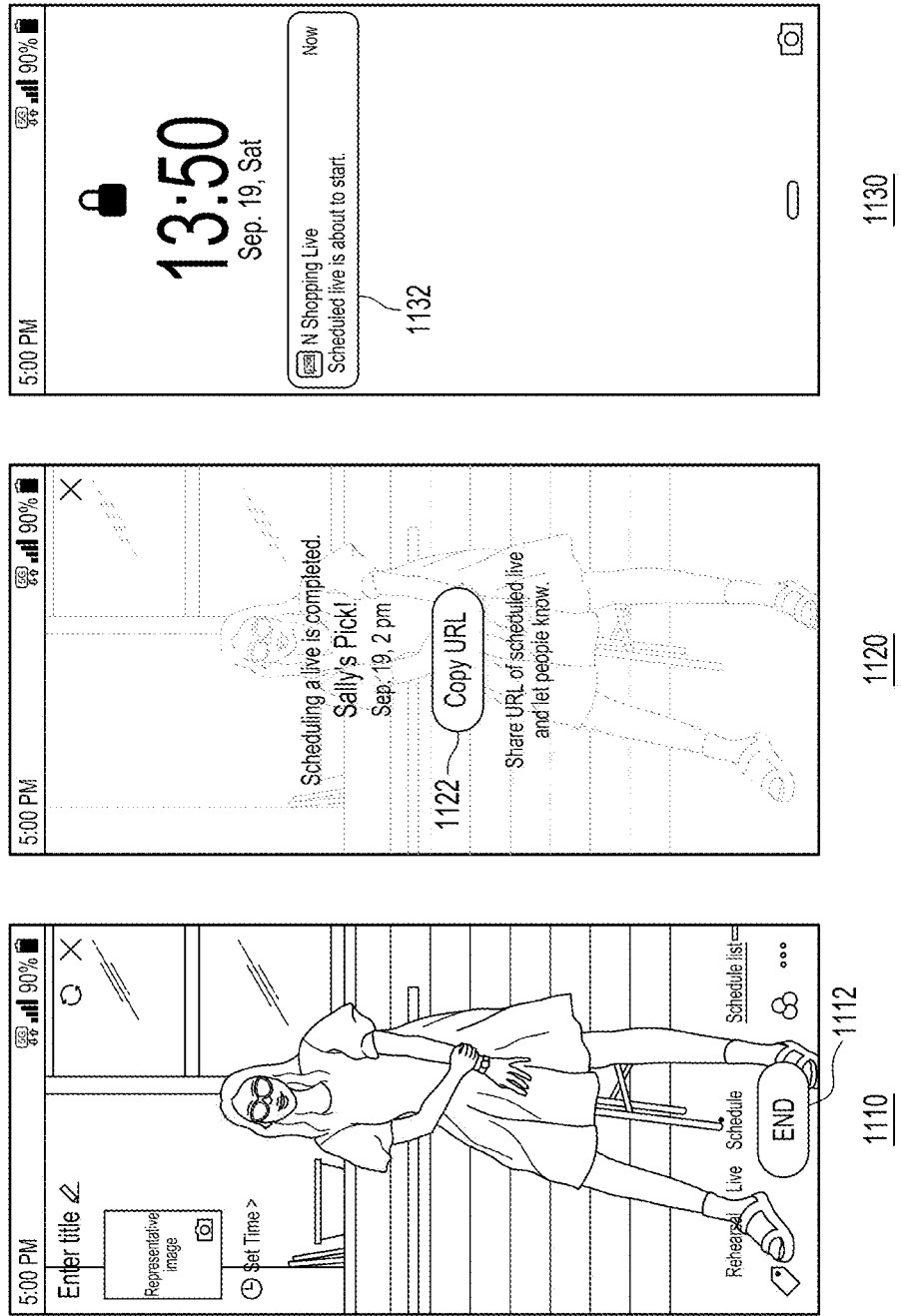
FIG. 11 illustrates an example diagram in which a seller schedules a live shopping broadcast according to an embodiment.

FIG. 11 illustrates an example in which the seller schedules a live shopping broadcast according to an embodiment. FIG. 11 illustrates a first operation step 1110, a second operation step 1120, and a third operation step 1130 of the seller terminal 210. The first operation step 1110 shows the seller terminal 210 displaying a first icon 1112 for scheduling a live shopping broadcast. According to an embodiment, the seller may select the first icon 1112 and input time information to schedule a live shopping broadcast so that the broadcast starts at a future time point. In this case, the seller terminal 210 may transmit a request to schedule a live shopping broadcast to an external device associated with the live shopping broadcast platform. In response to receiving the request to schedule a live shopping broadcast, the external device may automatically start the live shopping broadcast at a set time point without a separate start request from the seller.

The second operation step 1120 shows the seller terminal 210 displaying a second icon 1122 for receiving a link (e.g., Uniform Resource Locator (URL) information) associated with the scheduled live shopping broadcast in response to the seller selecting the first icon 1112. The seller may receive and store the link to the scheduled live shopping broadcast by selecting a second icon 1122 by a touch input or the like. For example, the seller terminal 210 may receive a link to the scheduled live shopping broadcast from an external device associated with the live shopping broadcast platform. With such a configuration, the seller can share the link associated with the scheduled live shopping broadcast with a specific or unspecified number of users, and promote the live shopping broadcast before the start of the live shopping broadcast. A user receiving the link associated with the scheduled live shopping broadcast can easily watch the live shopping broadcast by using the link.

The third operation step 1130 shows the seller terminal 210 displaying a message 1132 for notifying the start of the scheduled live shopping broadcast. As illustrated, when the seller schedules the live shopping broadcast to start at a future time point (September 19 at 2 pm), the seller terminal 210 may display the message 1132 on the display before the start time point of the live shopping broadcast. For example, by displaying the message 1132 on the display of the seller terminal 210 10 minutes before the start time point of the live shopping broadcast (September 19, 1:50 pm), the seller may not miss capturing the scheduled live shopping broadcast.

Figure 12:
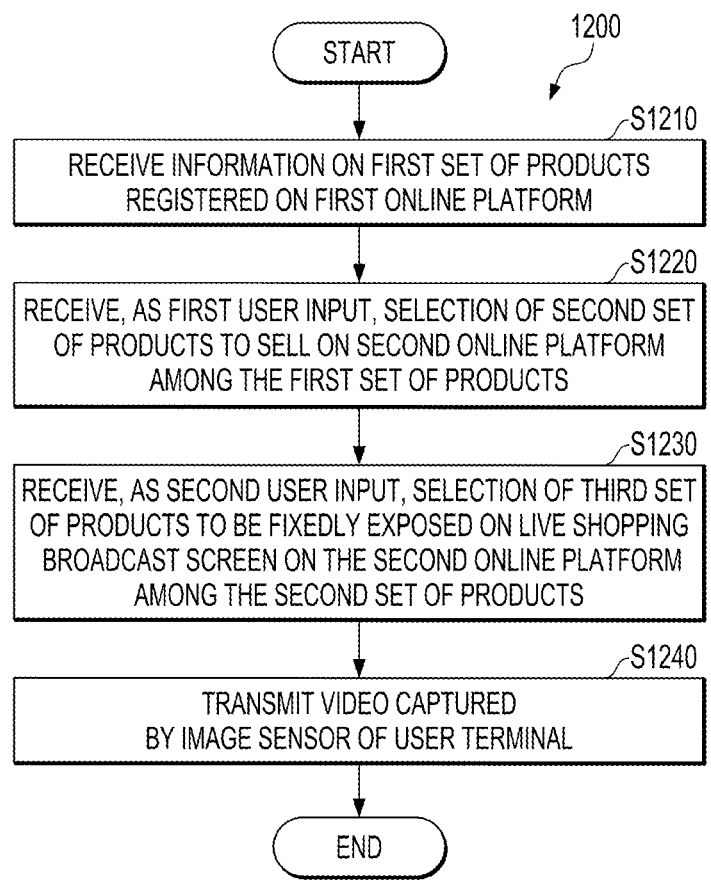
FIG. 12 is a flowchart for describing a method for controlling a live shopping broadcast according to an embodiment.

FIG. 12 illustrates a method 1200 for controlling live shopping broadcast according to an embodiment. According to an embodiment, the method 1200 of controlling a live shopping broadcast may be performed by the seller terminal 210 (e.g., one or more processors of the user terminals 210_1, 210_2 and 210_3). The method 1200 may be initiated by receiving information on a first set of products registered on a first online platform by the seller terminal 210, at S1210. For example, the seller terminal may 210 receive information on the first set of products from the first external device 232 associated with the first online platform. Alternatively or additionally, the seller terminal 210 may receive information on the first set of products via the second external device 234 associated with the second online platform.

Thereafter, the seller terminal 210 may receive from the user, as a first user input, a selection of a second set of products to sell in the live shopping broadcast on the second online platform among the first set of products, at S1220. Here, the first online platform may be an online sales platform provided by the first external device 232. In addition, the second online platform may be a live shopping broadcast platform provided by the second external device 234. The seller terminal 210 may log in to the first online platform and the second online platform using the same user account. The seller terminal 210 may transmit information on the second set of products to the second external device 234. According to an embodiment, in response to receiving the first user input, information on the second set of products to sell in the live shopping broadcast may be displayed on the display of the seller terminal 210. Here, the information on the second set of products may include a product name, a price, and a representative image of each product.

The seller terminal 210 may receive from the user, as a second user input, a selection of a third set of products to be fixedly exposed on the live shopping broadcast screen on the second online platform among the second set of products, at S1230. According to an embodiment, in response to receiving the second user input, a fixed exposure icon may be displayed on the third set of products among the second set of products displayed on the display of the seller terminal 210. The seller terminal 210 may transmit information on the third set of products to the second external device 234. According to an embodiment, at least one of the representative image, the product name, the price, or the discount rate for each of the third set of products may be fixedly exposed on the live shopping broadcast screen (e.g., the live shopping broadcast screen displayed on the purchaser terminal). In addition, the types of information on the third set of products fixedly exposed on the live shopping broadcast screen may be determined based on the number of products in the third set.

In response to receiving the request to start a live shopping broadcast from the user, the seller terminal 210 may transmit a video captured by the image sensor of the seller terminal 210 to the second external device 234, at S1240. According to another embodiment, in response to receiving the request to schedule a live shopping broadcast from the user, the seller terminal 210 may transmit a video captured by the image sensor of the seller terminal at a future time point to the second external device 234.

Figure 13:
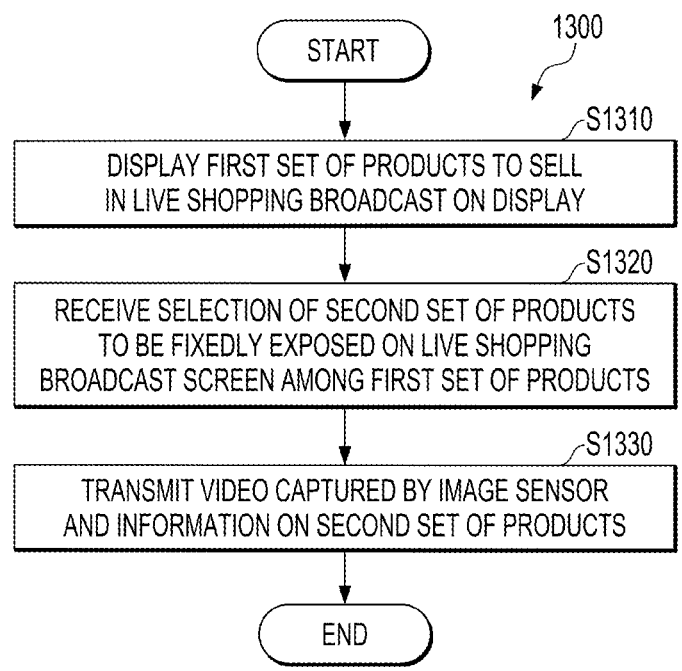
FIG. 13 is a flowchart for describing a method for controlling a live shopping broadcast according to an embodiment.

FIG. 13 illustrates a method 1300 for controlling a live shopping broadcast according to an embodiment. According to an embodiment, the method 1300 for controlling a live shopping broadcast may be performed by the seller terminal 210 (e.g., one or more processors of the user terminals 210_1, 210_210_3). The method 1300 may be initiated by displaying a first set of products to sell in the live shopping broadcast on the display of the seller terminal 210 by the seller terminal, at S1310.

After that, the seller terminal 210 may receive from the user a selection of a second set of products to be fixedly exposed on the live shopping broadcast screen among the first set of products, at S1320. In addition, the seller terminal 210 may transmit a video captured by the image sensor and information on the second set of products, at S1330. For example, the seller terminal 210 may transmit the captured video and information on the second set of products to an external device (e.g., an external device associated with the live shopping broadcast platform).

Figure 14:
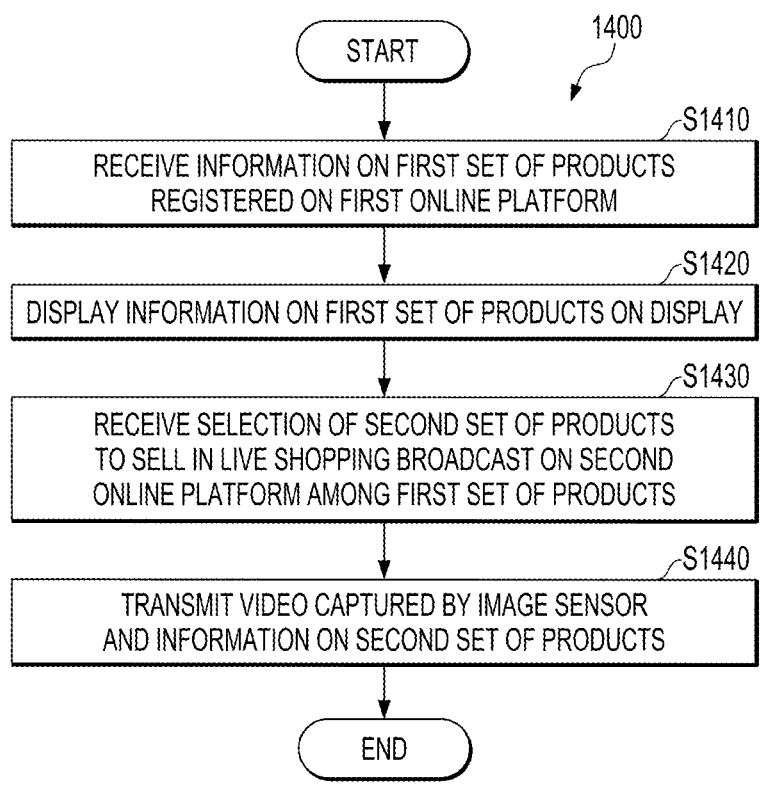
FIG. 14 is a flowchart for describing a method for controlling a live shopping broadcast according to an embodiment.

FIG. 14 illustrates a method 1400 for controlling a live shopping broadcast according to an embodiment. According to an embodiment, the method 1400 for controlling a live shopping broadcast may be performed by the seller terminal 210 (e.g., one or more processors of the user terminals 210_1, 210_210_3). The method 1400 may be initiated at the seller terminal 210 by receiving information on a first set of products registered as products for sale of a user account associated with the seller terminal on the first online platform, at S1410.

After that, the seller terminal 210 may display information on the first set of products on the display of the seller terminal, at S1420. In addition, the seller terminal 210 may receive from the user a selection of a second set of products to sell in the live shopping broadcast on a second online platform among the first set of products, at S1430. In addition, the seller terminal 210 may transmit a video captured by the image sensor of the seller terminal 210 and information on the second set of products to the second external device 234 at S1440. According to an embodiment, the first online platform may be an online sales platform provided by the first external device 232, and the second online platform may be a live shopping broadcast platform provided by the second external device 234.

The live shopping broadcast control methods described above may be provided as a computer program stored in a computer-readable non-transitory recording medium for execution on a computer. The medium may continuously store a program executable by a computer or temporarily store a program for execution or download. In addition, the medium may be a variety of recording means or storage means in a form in which a single piece of hardware or several pieces of hardware are combined, but is not limited to a medium directly connected to any computer system, and may be present on a network in a distributed manner. An example of the medium includes any that is configured to store program instructions, which may include a magnetic medium such as a hard disk, a floppy disk, and a magnetic tape; an optical medium such as a CD-ROM and a DVD; a magnetic-optical medium such as a floptical disk; and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for selling products in a live content broadcast, using a first online platform that provides an online shopping mall and a second online platform, which is independent of the first online platform, that provides live content broadcasting, performed by one or more processors of a user terminal, the method comprising:
   acquiring, by the user terminal accessing the first online platform via the second online platform, information on a first set of products registered as products for sale of a user account associated with the user terminal of a seller from the first online platform;
   receiving from the seller, as a first user input on a user interface of the user terminal of the seller, a selection of a second set of products from among the first set of products to sell in the live content broadcast on a second online platform different from the first online platform prior to the live content broadcast;
   registering, in response to the first user input, the second set of products on the second online platform so that information on the second set of products is exposed on the live content broadcast screen conducted by the seller;
   receiving from the seller, as a second user input on the user interface of the seller, a selection of a third set of products to be fixedly exposed on the live content broadcast screen on the second online platform from among the second set of products; and
   starting the live content broadcast on the second online platform,
   sorting and displaying the second set of products on the live content broadcast screen during the live content broadcast based on information on the quantity of sales of the second set of products during the live content broadcast; and
   displaying an image of a representative product of the third set of products in a designated area on the live content broadcast screen, wherein the representative product is set by the seller and the image of the representative product includes information on at least the representative product,
   wherein the first online platform is an online sales platform provided by a first external device, and the second online platform is a live shopping broadcast platform provided by a second external device, and
   a purchase of a product from the second set of products or the third set of products displayed on the live content broadcast screen is made through the online sales platform.

2. The method according to claim 1, wherein, in response to receiving a request on the user interface to start the live content broadcast from the seller, transmitting a video captured by an image sensor of the user terminal of the seller to the second external device.

3. The method according to claim 1, further comprising, in response to receiving the first user input on the user interface, displaying, on a display of the user terminal of the seller, information on the second set of products to sell in the live content broadcast, wherein
   the information on the second set of products includes a product name, a price, and a representative image of each of the second set of products.

4. The method according to claim 3, further comprising, in response to receiving the second user input on the user interface, displaying a fixed exposure icon on the third set of products among the second set of products displayed on the display of the user terminal of the seller.

5. The method according to claim 1, further comprising:
   after receiving a request on the user interface to start the live content broadcast from the seller, receiving from the seller a request on the user interface to change the products for sale;
   in response to receiving the request to change the products for sale, displaying information on the second set of products on a display of the user terminal of the seller;
   receiving from the seller a third user input on the user interface for removing at least one of the second set of products; and
   in response to receiving the third user input, displaying a fourth set of products on the display of the user terminal of the seller, wherein the fourth set of products are the second set of products from which at least one product has been removed.

6. The method according to claim 1, further comprising:
   after receiving a request on the user interface to start the live content broadcast from the seller, receiving from the seller a request on the user interface to change the products for sale;
   in response to receiving the request to change the products for sale, displaying information on the second set of products on a display of the user terminal of the seller;
   receiving from the seller a request on the user interface to add products for sale;
   in response to receiving the request to add the products for sale, displaying information on the first set of products on the display of the user terminal of the seller;
   receiving from the seller, as a third user input on the user interface, a selection of products to additionally sell in the live content broadcast among the first set of products; and
   in response to receiving the third user input, displaying a fourth set of products on the display of the user terminal of the seller, wherein the fourth set of products are the second set of products added with the products to additionally sell.

7. The method according to claim 1, further comprising:
   after receiving a request on the user interface to start a live shopping broadcast from the seller, receiving from the seller a request on the user interface to change products for sale;
   in response to receiving the request to change the products for sale, displaying information on the third set of products on a display of the user terminal of the seller;
   receiving from the seller a third user input on the user interface for removing at least one of the third set of products; and
   in response to receiving the third user input, displaying a fixed exposure icon on a fourth set of products, wherein the fourth set of products are the third set of products from which at least one product is removed.

8. The method according to claim 1, further comprising:
   after receiving a request on the user interface to start the live content broadcast from the seller,
   receiving from the seller a request on the user interface to change products for sale;
   in response to receiving the request to change the products for sale, displaying information on the second set of products on a display of the user terminal of the seller;
   receiving from the seller a third user input on the user interface for adding at least one of the second set of products as a product to be fixedly exposed on the live shopping broadcast screen; and in response to receiving the third user input, displaying a fixed exposure icon on a product selected by the third user input.

9. The method according to claim 1, further comprising:
after receiving a request on the user interface to start the live content broadcast from the seller, receiving from the seller a request to change the products for sale;
receiving one or more images from an image sensor of the user terminal of the seller; and
determining an order of displaying the second set of products on the display of the user terminal of the seller, based on a comparison result of representative images of the second set of products and the one or more images.

10. The method according to claim 1, wherein at least one of a representative image, a product name, a price, or a discount rate for each of the third set of products is fixedly exposed on the live shopping broadcast screen.

11. The method according to claim 10, wherein types of information on the third set of products fixedly exposed on the live shopping broadcast screen are determined based on a number of the products in the third set.

12. The method according to claim 1, further comprising:
after receiving a request on the user interface to start the live content broadcast from the seller,
receiving sales quantity information for each of the second set of products from the first external device; and
displaying the sales quantity information for each of the received second set of products on a display of the user terminal of the seller.

13. The method according to claim 1, further comprising:
after receiving a request on the user interface to start the live shopping broadcast from the seller, and receiving from the seller a request to change the products for sale;
receiving sales quantity information for each of the second set of products from the first external device; and
determining an order of displaying the second set of products on a display of the user terminal of the seller, based on the sales quantity information for each of the second set of products.

14. The method according to claim 1, further comprising:
transmitting a request to schedule the live content broadcast to the second external device; and
receiving a link associated with the scheduled live content broadcast from the second external device.

15. The method according to claim 1, wherein an order of displaying the first set of products in an online store of the user account in the first online platform is changed based on at least one of the first user input or the second user input.

* * * * *